(Model.)

C. O. SMITH.
Ash-Pan for Locomotives.

No. 226,799.   Patented April 20, 1880.

Witnesses:
P. L. Ourand
H. Aubrey Toulmin

Inventor:
C. O. Smith
By Alexander Mason
atty

UNITED STATES PATENT OFFICE.

CHARLES O. SMITH, OF SELMA, ALABAMA.

ASH-PAN FOR LOCOMOTIVES.

SPECIFICATION forming part of Letters Patent No. 226,799, dated April 20, 1880.

Application filed March 1, 1880. (Model.)

*To all whom it may concern:*

Be it known that I, CHARLES O. SMITH, of Selma, in the county of Dallas, and in the State of Alabama, have invented certain new and useful Improvements in Ash-Pans for Locomotives and all Steam-Generators; and I do hereby declare that the following is a full, clear, and exact description thereof, reference being had to the accompanying drawings, and to the letters of reference marked thereon, making a part of this specification.

My invention relates to perforated ash-pans for locomotive-engines and other steam-generators; and it consists in certain peculiarities of construction, as will be hereinafter more fully set forth, and pointed out in the claims.

In order to enable others skilled in the art to which my invention appertains to make and use the same, I will now proceed to describe its construction and operation, referring to the annexed drawings, in which—

Figure 1:
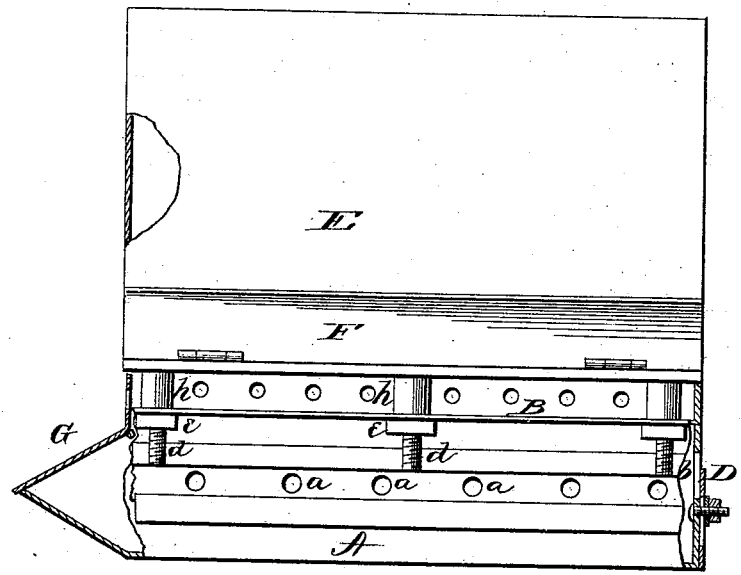
Figure 2:
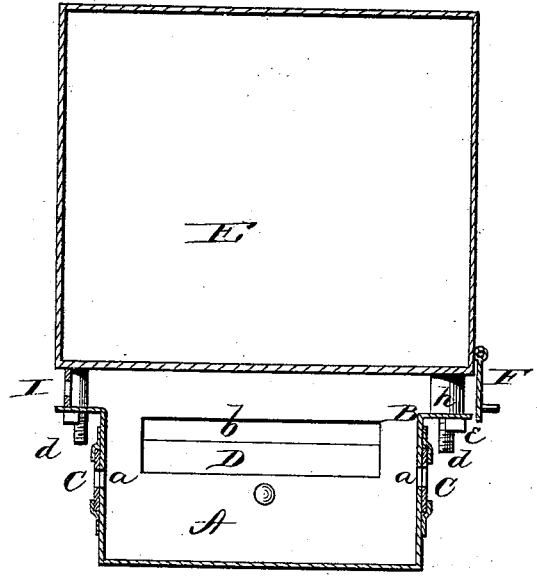

Figure 1 is a side view of a fire-box with ash-pan partly in section. Fig. 2 is a vertical cross-section of the same.

A represents the ash-pan, provided with side flanges, B, at the top, side perforations, $a$, with sliding dampers C, and end slots, $b$, with adjustable dampers D, substantially the same as described in another application for patent made by me. This ash-pan is attached to a fire-box or leg of a boiler, E, by the ordinary studs $d$, by which all ash-pans are suspended. I however insert short thimbles or washers $h$ on these studs between the ash-pan and fire-box, which drops the pan down from the fire-box to any desired distance, thereby leaving a space or slots, $i$, between them, through which a draft of cold air is admitted. These slots or openings are provided with hinged dampers F attached to the side of the fire-box. These dampers can be operated by rod-connections from the foot-board, as all other dampers are operated to regulate draft.

A perforated plate, I, may be inserted between the ash-pan and bottom of fire-box, to be used instead of the entire open space or slots produced by dropping the pan, as the nature of the draft may require.

The studs $d$ may be of any desired length, and are provided with nuts $e$, by which the space or slots between the pan and fire-box may be increased or diminished at will.

The ash-pan is made diamond-pointed at one end and provided with a damper, G, operated by a rod from the cab, in the usual manner.

The perforated plate I, when used, is to extend all around between the ash-pan and fire-box.

Having thus fully described my invention, what I claim as new, and desire to secure by Letters Patent, is—

1. An ash-pan dropped down from the fire-box, so as to leave a space or opening between them, and provided with dampers to regulate the admission of air through said space or opening, substantially as herein set forth.

2. The combination of the fire-box E, ash-pan A, studs $d$, thimbles or washers $h$, and nuts $e$, substantially as and for the purposes herein set forth.

In testimony that I claim the foregoing I have hereunto set my hand this 23d day of February, 1880.

CHARLES O. SMITH.

Witnesses:
A. P. YOUNG,
J. R. SATTERFIELD.